Oct. 8, 1935.  E. A. WILSON  2,016,979
MILK CAN COVER
Filed Oct. 25, 1934
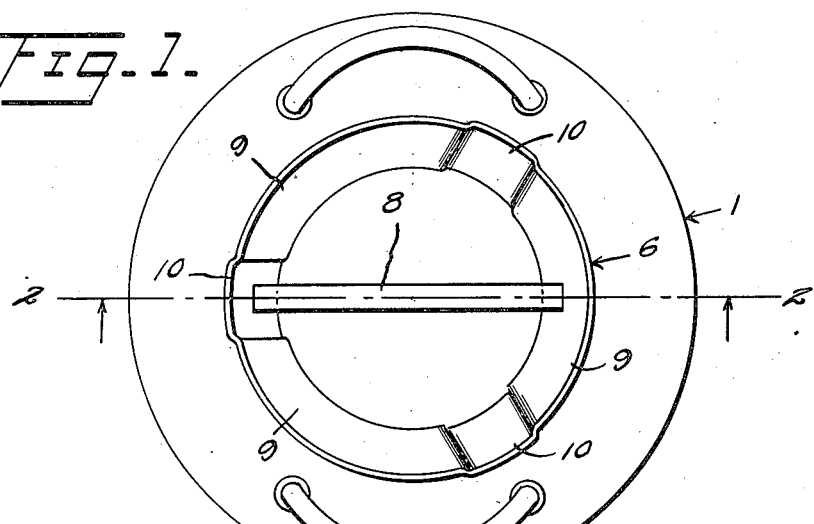
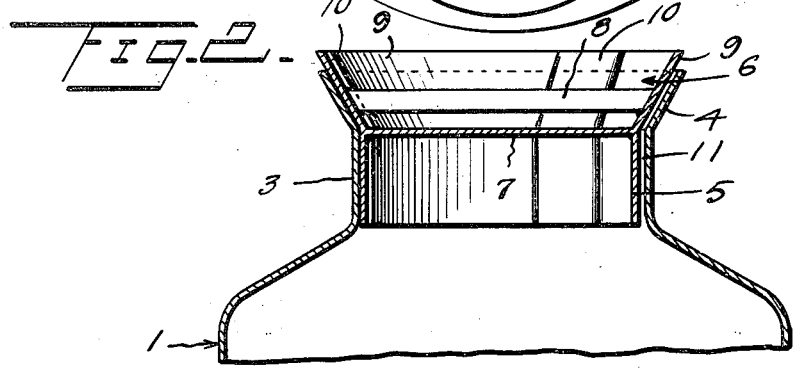
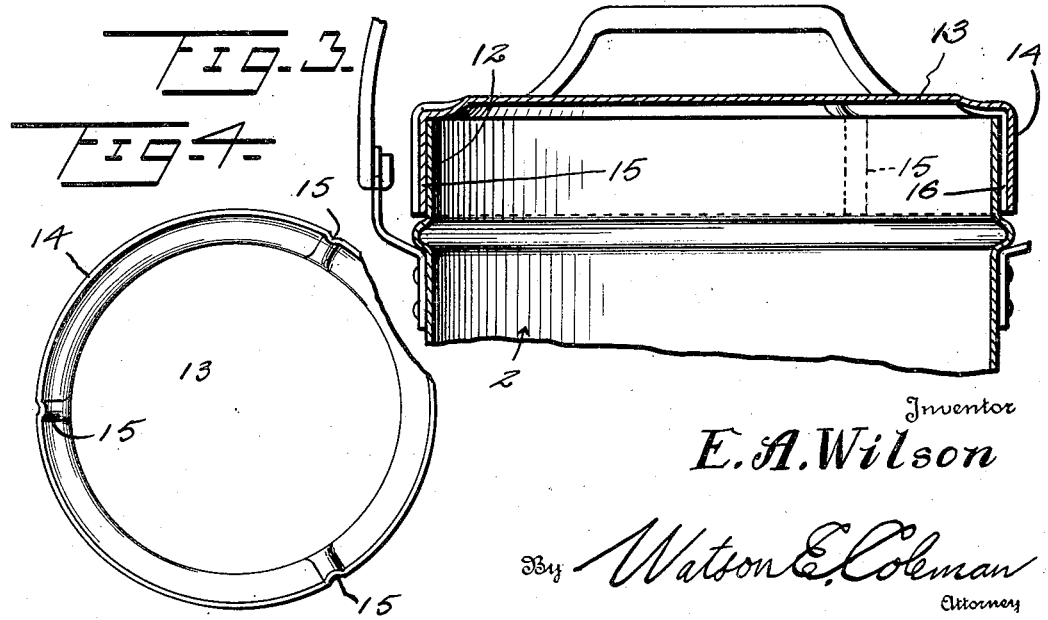
Inventor
E. A. Wilson
By Watson E. Coleman
Attorney Patented Oct. 8, 1935

2,016,979

UNITED STATES PATENT OFFICE 2,016,979

MILK CAN COVER

Egbert A. Wilson, Hayfield, Minn.

Application October 25, 1934, Serial No. 749,970

1 Claim. (Cl. 220—44)

This invention relates to improvements in receptacles designed to contain milk and pertains particularly to an improved cover or lid for such receptacles.

In dairying it is highly important that milk and cream be properly areated at all times to prevent the formation in the receptacles in which the milk and cream are placed, of unpleasant odors and it is particularly important that milk be kept unconfined immediately after it is obtained and before it has lost the animal heat.

The primary object of the present invention is to provide a milk can cover which is so designed that gases developed in the can from milk therein will be free to escape but the contents of the can cannot be spilled or splashed out and the entrance of dust or dirt will be prevented.

A further object of the invention is to provide a lid structure so designed that the foregoing desirable results may be obtained, which is of extremely simple design and inexpensive to manufacture.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in top plan of a milk can showing a top of the character embodying the present invention.

Figure 2 is a vertical section taken on the lines 2—2 of Figure 1.

Figure 3 is a sectional view through a cream setting can showing the top constructed in accordance with the present invention.

Figure 4 is a bottom plan view of the top shown in Figure 3.

In the illustration and description of the present invention, two forms of cans used in the dairy business will be considered, one form being that of the type employed for shipping milk while the other is of the type in which cream is placed and is known as a cream setting can.

Particular reference now being made to the drawing, it will be noted that Figure 1 illustrates the upper portion of a can of the type commonly employed for shipping milk, the same being indicated generally by the numeral 1 while the numeral 2 indicates in Figure 3 the upper portion of the type of can above described as a cream setting can.

In carrying out the present invention in connection with the type of can illustrated in Figure 1, it will be noted that this can has a neck 3 terminating at its top in an outwardly flared lip 4 and the lid for the can comprises a sleeve portion 5 and an outwardly flaring collar 6 which is integral therewith and forms the upper end of the same. This sleeve and collar is shaped from a single piece of sheet metal material and the sleeve portion is closed by a wall 7 so that when the sleeve is in place in the neck of the can the latter will be securely closed against the escape of the can contents.

The usual handle 8 extends across the top of the lid between the inner faces of the flaring collar 6.

In the formation of the lid described, the portions 5 and 6 thereof have areas 9 pressed inwardly, as illustrated, these areas extending the entire length of the lid body. It is preferred that these areas 9 be forced inwardly a distance not greater than the thickness of the metal of which the lid is formed. The areas 9, as shown, are relatively wide so that the portions 10 which remain and which define the original diameter of the lid, are relatively narrow. These portions have their outer surfaces in contact with the inner surfaces of the can neck and lip so that the outer surfaces of the portion 9 are spaced from the can, neck and lip, as illustrated, and provide air passageways 11 between the interior and the exterior of the can.

It will thus be apparent that while the interior of the can is in communication with the outside atmosphere through the passages 11, these passages are very narrow and while gases generated in the can may freely escape, the liquid contents of the can cannot escape.

In Figures 3 and 4, the cream setting can illustrated has a straight neck portion 12 about the mouth thereof, which mouth is covered by a lid having a top 13 and a depending flange 14. The flange 14 and the top adjacent its periphery has a series of inpressed ribs 15 formed therein which engage the outer surface of the neck portion 12 in the manner illustrated, thus maintaining the major portion of the flange 14 free from contact with the neck to provide the air spaces 16. Since the inpressed ribs 15 extend a short distance inwardly beyond the flange 14 of the cover into the top of the same, it will be apparent that the top edge of the neck 12 cannot come into contact with the entire inner surface of the top portion 13 of the lid so that the escape of gases from the can beneath the lid will not be prevented.

From the foregoing, it will be readily apparent that the can lids herein described may be easily and inexpensively produced and will operate efficiently to areate the contents of the cans which they close and at the same time will prevent the escape of the contents.

What is claimed is:

A cover for a receptacle having a mouth opening having a straight wall and a straight upwardly and outwardly flaring surrounding lip, comprising a top, a straight flange extending down from the top to enter said mouth opening, a straight upwardly and outwardly flaring flange surrounding the top to engage the inner surface of said lip, said flange being of greater length than the lip and projecting above the top edge of the same, and said outwardly and downwardly extending flanges having merging impressed areas extending throughout their lengths to maintain an air passageway between the flanges and the mouth opening wall and lip and extending throughout the lengths of the latter.

EGBERT A. WILSON.